(12) United States Patent
Misu et al.

(10) Patent No.: US 8,968,150 B2
(45) Date of Patent: Mar. 3, 2015

(54) DAMPER DEVICE

(75) Inventors: Takahiro Misu, Nagoya (JP); Tomohiro Saeki, Anjo (JP); Satoshi Nakagaito, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 509 days.

(21) Appl. No.: 13/120,042

(22) PCT Filed: Mar. 9, 2010

(86) PCT No.: PCT/JP2010/053912
§ 371 (c)(1),
(2), (4) Date: Mar. 21, 2011

(87) PCT Pub. No.: WO2010/104081
PCT Pub. Date: Sep. 16, 2010

(65) Prior Publication Data
US 2011/0177906 A1    Jul. 21, 2011

(30) Foreign Application Priority Data
Mar. 13, 2009  (JP) ................................. 2009-061924

(51) Int. Cl.
*F16H 35/10*     (2006.01)
*F16D 1/02*      (2006.01)
(Continued)

(52) U.S. Cl.
CPC ............. *F16F 15/1395* (2013.01); *B60K 6/365* (2013.01); *B60K 6/445* (2013.01);
(Continued)

(58) Field of Classification Search
CPC ........... F16H 35/10; F16D 7/025; F16D 7/00; F16D 3/14; F16D 43/213; F16D 43/215; B60K 6/11; B60K 6/20; B60K 6/36; F16F 15/12

USPC ............... 475/263, 347; 464/68.41; 192/30 V
See application file for complete search history.

(56) References Cited

U.S. PATENT DOCUMENTS

| | | | | |
|---|---|---|---|---|
| 4,274,524 A | * | 6/1981 | Nakane | 192/70.17 |
| 4,790,419 A | * | 12/1988 | Loizeau | 192/70.18 |

(Continued)

FOREIGN PATENT DOCUMENTS

| | | |
|---|---|---|
| CN | 1262728 A | 8/2000 |
| CN | 1727723 A | 2/2006 |

(Continued)

OTHER PUBLICATIONS

Japanese Office Action (Notice of Grounds for Rejection) dated Sep. 18, 2012, issued by the Japanese Patent Office in corresponding Japanese Patent Application No. 2009-061924 and English translation. (6 pages).

(Continued)

*Primary Examiner* — Edwin A Young
*Assistant Examiner* — Colby M Hansen
(74) *Attorney, Agent, or Firm* — Buchanan Ingersoll & Rooney PC (57) ABSTRACT

A damper device includes a damper unit arranged on a motive power transmission path between a motive power source and a gear mechanism and configured for absorbing torque fluctuations that might be generated by elastic force between the motive power source and the gear mechanism. The damper device also includes a limiter unit that produces slip when the torque fluctuations have exceeded a preset value. The limiter unit is arranged on a motive power transmission path between the damper unit and the gear mechanism.

19 Claims, 8 Drawing Sheets

(51) Int. Cl.
　　　*B60K 6/00*　　　(2006.01)
　　　*F16F 15/139*　　(2006.01)
　　　*B60K 6/365*　　 (2007.10)
　　　*B60K 6/445*　　 (2007.10)
　　　*B60L 11/12*　　 (2006.01)
　　　*B60L 11/14*　　 (2006.01)
　　　*F16D 3/14*　　　(2006.01)
　　　*F16D 7/02*　　　(2006.01)
　　　*B60K 1/02*　　　(2006.01)
　　　*F16H 37/08*　　 (2006.01)

(52) U.S. Cl.
　　　CPC .............. *B60L 11/123* (2013.01); *B60L 11/14* (2013.01); *F16D 3/14* (2013.01); *F16D 7/025* (2013.01); *B60K 1/02* (2013.01); *B60L 2260/14* (2013.01); *B60L 2270/145* (2013.01); *F16H 2037/0866* (2013.01); *F16H 2200/2005* (2013.01); *Y02T 10/6217* (2013.01); *Y02T 10/6239* (2013.01); *Y02T 10/7077* (2013.01)
　　　USPC .......... 475/347; 475/331; 475/263; 192/30 V; 192/56.1; 464/68.41

(56) References Cited

U.S. PATENT DOCUMENTS

| | | | | |
|---|---|---|---|---|
| 4,889,218 | A | * | 12/1989 | Chasseguet et al. ....... 464/68.92 |
| 5,673,598 | A | * | 10/1997 | Duclos ......................... 464/68.4 |
| 6,402,622 | B1 | | 6/2002 | Jackel et al. |
| 6,547,227 | B1 | | 4/2003 | Mende |
| 7,559,844 | B2 | | 7/2009 | Saeki et al. |
| 2002/0194949 | A1 | | 12/2002 | Kintou et al. |
| 2007/0193404 | A1 | | 8/2007 | Rohs |
| 2009/0294239 | A1 | * | 12/2009 | Nakagaito et al. ........... 192/55.1 |
| 2010/0139450 | A1 | | 6/2010 | Rohs |

FOREIGN PATENT DOCUMENTS

| | | |
|---|---|---|
| CN | 1946953 A | 4/2007 |
| EP | 1621796 B1 | 2/2006 |
| JP | 55-033036 U | 3/1980 |
| JP | 10-073147 A | 3/1998 |
| JP | 2002-013547 A | 1/2002 |
| JP | 2003-013992 A | 1/2003 |
| JP | 2003-222192 A | 8/2003 |
| JP | 2006-90425 A | 4/2006 |
| JP | 2008-304008 A | 12/2008 |

OTHER PUBLICATIONS

Chinese Office Action (Notification of the First Office Action) dated Sep. 13, 2012, issued by the State Intellectual Property Office in P.R.C in corresponding Chinese Patent Application No. 201080002796.4 and English translation. (15 pages).

International Search Report (PCT/ISA/210) issued on Apr. 13, 2010, by Japanese Patent Office as the International Searching Authority for International Application No. PCT/JP2010/053912.

Written Opinion (PCT/ISA/237) issued on Apr. 13, 2010, by Japanese Patent Office as the International Searching Authority for International Application No. PCT/JP2010/053912.

Office Action (Notice of Grounds for Rejection) dated May 7, 2013, issued in corresponding Japanese Patent Application No. 2009-061924, and an English Translation of the Office Action. (5 pages).

* cited by examiner

DAMPER DEVICE

TECHNICAL FIELD

This invention claims priority rights based on the corresponding JP Patent Application 2009-061924 filed on Mar. 13, 2009. The entire disclosure of this patent application is to be incorporated by reference into the present application.
This invention relates to a damper device that absorbs torque fluctuations occurring between shafts of rotation. More particularly, it relates to a damper device including a limiter unit that produces slip in case the torque fluctuations have reached a preset value.

BACKGROUND

A damper device is arranged on, for instance, a motive power transmitting path between an engine and a transmission to absorb (suppress) torque fluctuations produced by the engine and the transmission. The damper device includes a damper unit that absorbs torque fluctuations by the spring force, a hysteresis unit that absorbs (suppresses) torque fluctuations by a hysteresis torque brought about by, for instance, friction, and a limiter unit. The limiter unit produces slip when the damper unit or the hysteresis unit is unable to absorb the torsion of a rotational shaft. In the motive power transmission device, having such damper device, the chattering sound of the gear teeth is produced at the transmission due to engine vibrations. Such chattering sound of the gear teeth at the transmission, ascribable to the engine vibrations, is most outstanding especially in case an input shaft of the transmission is connected via planetary gear mechanism to an electric motor (or, as the case may be, a generator/motor) in a motive power transmission mounted on a hybrid car having both an engine and an electric motor as motive power sources. To suppress the chattering sound from being generated, it has been known to provide an inertial member, in addition to the damper device, on a motive power transmission path between the engine and the transmission.

Patent Document 1, for example, shows a damper for a hybrid driving device in which the motive power is transmitted as torque fluctuations due to the first and second motive power sources are suppressed from being generated. The damper includes a first rotational member, which is run in rotation by the first driving power source, and a second rotational member, which is connected to the second driving power source via a planetary gear mechanism. The damper also includes a torsion member that suppresses torque fluctuations between the first rotational member and the second rotational member, and a limiter unit. The limiter unit interrupts transmission of the motive power from the first rotational member to the second rotational member when the torque fluctuations between the first and second motive power sources have reached a preset value. The damper further includes an inertial member provided on the first or second rotational member.
PATENT DOCUMENT 1: JP PATENT KOKAI JP-A-2002-13547

SUMMARY OF THE DISCLOSURE

The entire disclosed contents of the Patent Document 1 are to be incorporated herein by reference. The following analysis is given by the present disclosure.
In the damper for a hybrid driving device, disclosed in Patent Document 1, a limiter mechanism of a larger inertial force is provided between a torsion member (damper) and a fastening portion on a site of a motive power transmitting path which is closer to the engine than is the torsion member (damper). The fastening portion is a site where the damper is fastened to the first rotational member by a bolt. In addition, an inertial member is provided in a space between the damper and the transmission. Consequently, the size of the device is increased in both the radial and axial directions.

It is a principal object of the present disclosure to provide a damper device whereby it is possible to eliminate the chattering sound of the gear teeth in a transmission even though the device has been reduced in size.

In one aspect, the present disclosure provides a damper device comprising a damper unit and a limiter unit. The damper unit is arranged on a motive power transmission path between a motive power source and a gear mechanism and configured for absorbing torque fluctuations produced between the motive power source and the gear mechanism by way of elastic force. The limiter unit produces slip when the torque fluctuations have exceeded a preset value, and is disposed on a motive power transmission path between the damper unit and the gear mechanism.

PREFERRED MODES

In the damper device according to the present disclosure, the damper device preferably includes a first assembly and a second assembly assembled on the first assembly, in which the first assembly includes the damper unit and the limiter unit which are formed as an integral unit, the second assembly including a plate member mounted on an output shaft of the motive power source.

In the damper device according to the present disclosure, the outer shape of the limiter unit is preferably larger in size than that of the damper unit.

In the damper device according to the present disclosure, it is preferred that the damper unit and the limiter unit are respective separate units, in which an input side component of the limiter unit is detachably engaged with an output side component of the damper unit, in which an output side component of the limiter unit is detachably engaged with a shaft connected to the gear mechanism.

In the damper device according to the present disclosure, it is preferred that the input side component of the limiter unit is in splined engagement with the output side component of the damper unit; the output side component of the limiter unit being in splined engagement with the shaft.

In the damper device according to the present disclosure, it is preferred that an input side component of the damper unit is directly mounted on the output shaft of the motive power source.

The damper device according to the present disclosure preferably further comprises a plate member mounted on the output shaft of the motive power source, the plate member also acting as an input side component of the damper unit.

In the damper device according to the present disclosure, the limiter unit is preferably arranged within a housing accommodating the gear mechanism.

In the damper device according to the present disclosure, the gear mechanism preferably includes a sun gear, a ring gear arranged on an outer periphery of the sun gear, a pinion meshing with the sun gear and the ring gear, and a carrier supporting the pinion for rotation; the carrier also acting as an output side component of the limiter unit.

In the damper device according to the present disclosure, the carrier preferably is a first carrier arranged on one side in the axial direction of the pinion, in which the gear mechanism also includes a second carrier arranged on the other side in the axial direction of the pinion, the second carrier having mounted thereon an inertial member.

MERITORIOUS EFFECT OF THE INVENTION

According to preferred modes of the present disclosure, the limiter unit is provided on a motive power transmission path between the limiter unit and the gear mechanism. Consequently, the limiter unit acts as an inertial member to enable suppression of the chattering sound in the gear mechanism. Moreover, since the limiter unit is provided on the motive power transmission path between the damper unit and the gear mechanism, the degree of freedom of the limiter unit mounting position is enhanced, thus allowing the device to be reduced in size.

Figure 1:
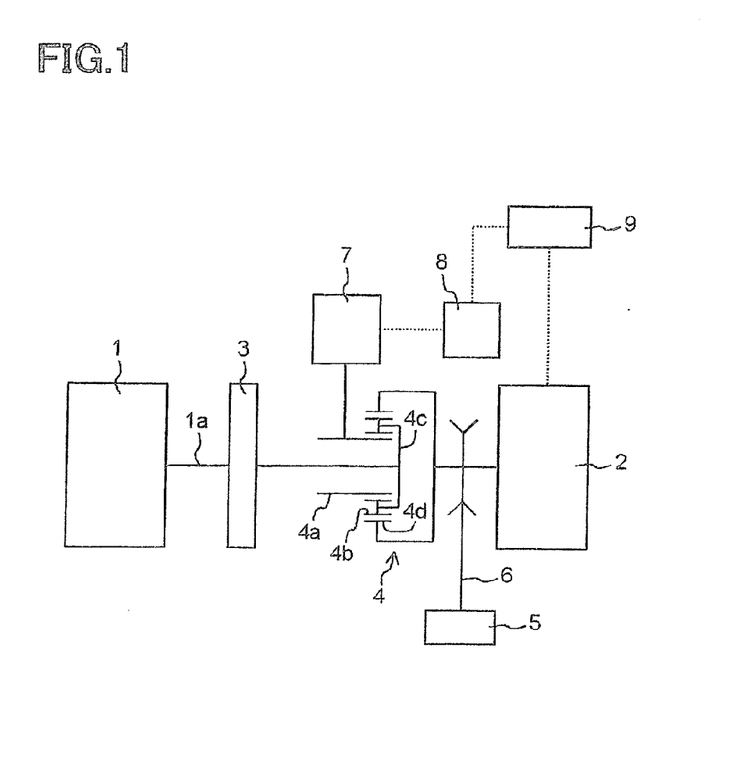
FIG. 1 is a schematic block diagram showing the formulation of a hybrid driving apparatus having a damper device according to Example 1 of the present disclosure.
Figure 2:
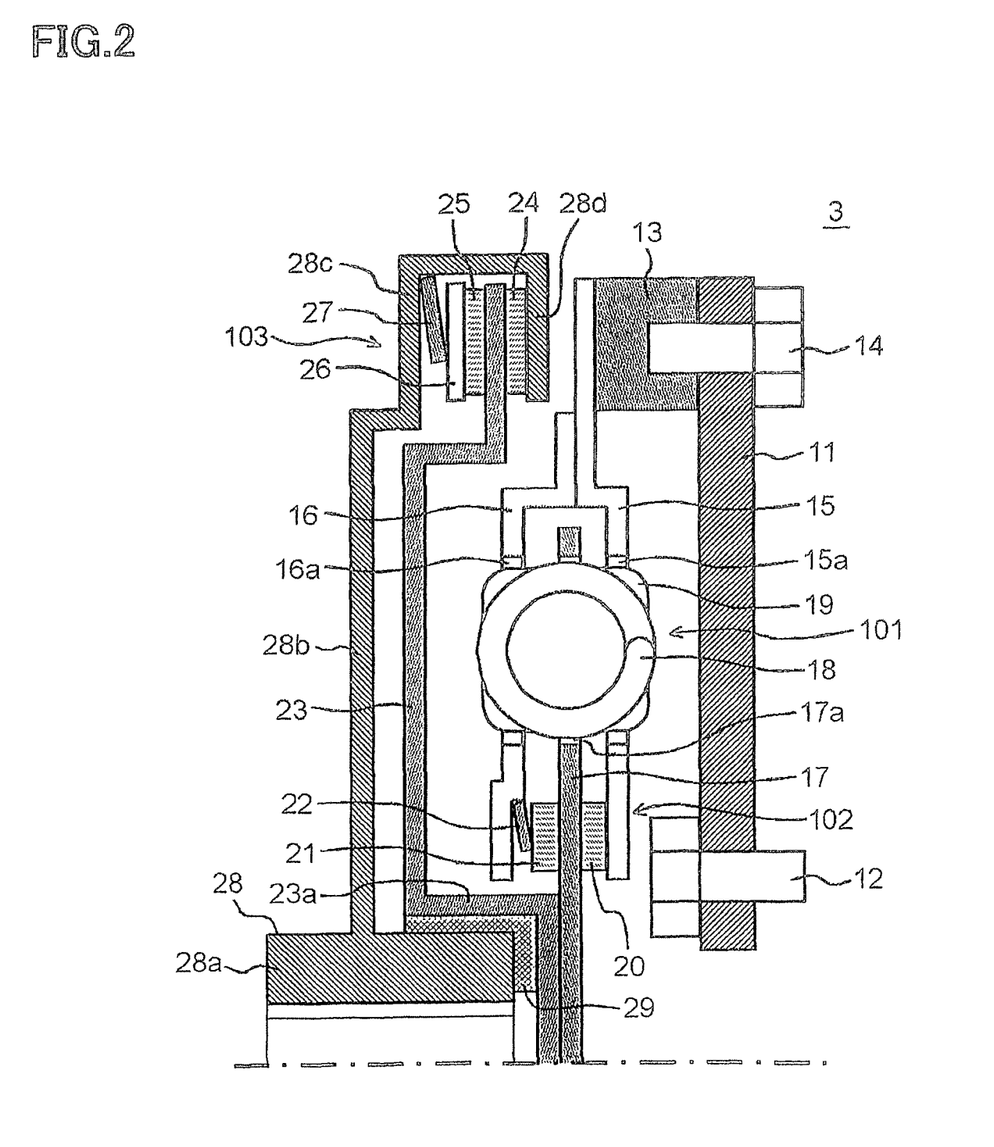
FIG. 2 is a schematic partial radial cross-sectional view showing the formulation of the damper device according to Example 1 of the present disclosure.

A damper device according to an exemplary embodiment 1 of the present disclosure includes a damper unit (101 of FIG. 2) and a limiter unit (103 of FIG. 2). The damper unit is arranged on a motive power transmission path between a motive power source (1 of FIG. 1) and a gear mechanism (gear train) (4 of FIG. 1) and configured for absorbing torque fluctuations produced between the motive power source and the gear mechanism by way of an elastic force. The limiter unit produces slip when the torque fluctuations have exceeded a preset value. The limiter unit is disposed on a motive power transmission path between the damper unit (101 of FIG. 2) and the gear mechanism (4 of FIG. 1).

Note the reference to signs of the Drawings mentioned in this disclosure is intended merely to help understanding of the disclosure, without limitative intention.

EXAMPLE 1

A damper device according to Example 1 of the present disclosure will now be described with reference to the drawings. FIG. 1 depicts a schematic block diagram showing a hybrid driving apparatus including the damper device according to Example 1 of the present disclosure. FIG. 2 depicts a partial cross-sectional view showing a formulation of the damper device according to Example 1 of the present disclosure.

Referring to FIG. 1, the hybrid driving apparatus includes an engine 1, as a first driving power source, an electric motor 2, as a second power source, and a damper device 3, arranged between the engine 1 and the electric motor 2 for suppressing torque fluctuations therebetween. The hybrid driving apparatus also includes a planetary gear mechanism 4 arranged between the electric motor 2 and the damper device 3, a reduction gear mechanism 5 for transmitting the motive power to a driving wheel, not shown, and a belt 6 interconnecting a ring gear 4d of the planetary gear mechanism 4 and the reduction gear mechanism 5. The hybrid driving apparatus further includes a generator/motor 7, connected to a sun gear 4a of the planetary gear mechanism 4, and a battery 9 electrically connected via an inverter 8 to the generator/motor 7 and to the electric motor 2.

An output shaft 1a of the engine 1 is connected via the damper device 3 to a carrier 4c of the planetary gear mechanism 4. A pinion 4b is carried for rotation on the carrier 4c and meshes with the sun gear 4a and with the ring gear 4d. The generator/motor 7 has its rotational shaft connected to the sun gear 4a of the planetary gear mechanism 4, and charges the electric energy generated on driving of the engine 1 to the battery 9. The electric motor 2 has its rotational shaft connected to the ring gear 4d.

If, in the hybrid driving apparatus, only the engine 1 is in operation, the rotational driving power of the engine 1 is transmitted via the damper device 3 to the carrier 4c of the planetary gear mechanism 4. Hence the carrier 4c in its entirety is run in rotation about an output shaft 1a of the engine 1. The ring gear 4d is thus run in rotation to transmit the motive power to the reduction gear mechanism 5 to drive a driving wheel, not shown. At this time, the sun gear 4a is also run in rotation, and the electric power generated by the generator/motor 7 is charged to the battery 9.

If, in the hybrid driving apparatus, the engine 1 is halted and only the electric motor 2 is run in rotation, the ring gear 4d is run in rotation, and hence the motive power is transmitted via a belt 6 to the reduction gear mechanism 5. At this time, the carrier 4c is in rotation about its own axis, without its location being changed, so that no motive power of the electric motor 2 is transmitted to the engine 1.

With the hybrid driving apparatus, it is possible to drive both the engine 1 and the electric motor 2 to transmit the motive power to the reduction gear mechanism 5. Such switching of the motive power sources (switching between the driving and non-driving of the electric motor 2) may be managed by a control device, not shown, based on a variety of control signals, such as car speed or accelerator opening degree.

Referring to FIG. 2, the damper device 3 in the hybrid driving apparatus includes a torsion buffer function, and includes a damper unit 101 that absorbs torque fluctuations by a spring force (elastic force). The damper device 3 also includes a hysteresis unit 102 that absorbs or suppresses torque fluctuations by the hysteresis torque produced e.g., by friction, and a limiter unit 103 that produces slip when the torsion has become unable to be absorbed or suppressed by the damper unit 101 or the hysteresis unit 102. For ease in assembling, the damper device 3 is formed as an assembly (integral unit) composed of the damper unit 101, hysteresis unit 102 and the limiter unit 103. The damper unit 101 is mounted in parallel with the hysteresis unit 102 and in series with the limiter unit 103. The limiter unit 103 is arranged on a path of motive power transmission between the damper unit 101 and the planetary gear mechanism 4 (4 of FIG. 1), and acts as an inertial member on an output side of the damper unit 101. The limiter 103 has an outer shape larger in size than that of the damper unit 101 for securing an inertial effect and a chattering suppressing effect. The damper device 3 includes a flywheel 11, a cylindrical member 13, bolts 14, side plates 15, 16, a center plate 17, a coil spring 18, a seat member 19, thrust members 20, 21, a saucer spring 22, a lining plate 23, friction members 24, 25, and a pressure plate 26. The damper device 3 includes a saucer spring 27, a hub member 28 and a bearing 29.

The flywheel 11 is an annular member fixedly mounted by a bolt(s) 12 on the output shaft (1a of FIG. 1) of the engine (1 of FIG. 1). The flywheel 11 is fixedly mounted by the bolt 14 in the vicinity of its radially outer rim to the cylindrical member 13 with a surface of the flywheel 11 facing the damper unit 101 in contact with the cylindrical member 13.

The cylindrical member 13 operates for spacing the flywheel 11 and the damper unit 101 apart from each other, and is connected to the side plate 15 by welding or caulking. The cylindrical member 13 is fixedly mounted by the bolt(s) 14 to the flywheel 11, as described above.

The bolt 14 is a member used for fixedly mounting the cylindrical member 13 to the flywheel 11. The bolt 14 is inserted from the side of the flywheel 11 opposite to the cylindrical member 13 side and tightened so as to be fastened to the cylindrical member 13.

The side plate 15 is an annular plate arranged on a side of the center plate 17 facing the flywheel 11, and is a component member of the damper unit 101 while also being a component member of the hysteresis unit 102. The side plate 15 is connected in the vicinity of its radially outer rim to the cylindrical member 13 by welding or caulking. The side plate 15 is connected at its portion radially outwardly spaced apart from the damper unit 101 to the side plate 16 by welding or caulking. In the damper unit 101, the side plate 15 includes a window 15a in which to hold the coil spring 18 and the seat member 19. The seat member is separably contacted with a peripheral end face of the window 15a. The side plate 15 is slidably pressure-contacted with the thrust member 20 in the hysteresis unit 102 at a radially more inner site than the damper unit 101.

The side plate 16 is an annular plate arranged on a side of the center plate 17 opposite from its side facing the flywheel 11, and is a component member of the damper unit 101, while being also a component member of the hysteresis unit 102. The side plate 16 is connected at a radially more outer site than the damper unit 101 to the side plate 15 by welding or caulking. In the damper unit 101, the side plate 16 includes a window 16a in which to hold the coil spring 18 and the seat member 19. The seat member is separably contacted with a peripheral end face of the window 16a. The side plate 16 carries a saucer spring 22 in the hysteresis unit 102 disposed radially more inwardly than the damper unit 101.

The center plate 17 is an annular or disc-shaped plate arranged halfway between the side plates 15, 16, and is a component member of the damper unit 101 while also being a component member of the hysteresis unit 102. In the damper unit 101, the center plate 17 includes a window 17a in which to hold the coil spring 18 and the seat member 19. The seat member 19 is separably contacted with a peripheral end face of the window 17a. In the hysteresis unit 102, disposed more radially inwardly than the damper unit 101, the center plate 17 is pressure contacted with the thrust members 20, 21 for sliding relative to the thrust members 20, 21. The center plate 17 is connected on its site more radially inner than the hysteresis unit 102 to the lining plate 23 by welding or caulking.

The coil spring 18 is a component member of the damper unit 101, and is housed in windows 15a, 16a formed in the side plates 15, 16 and in a window 17a formed in the center plate 17, so as to be contacted with the seat member 19 provided at either ends. When the side plates 15, 16 perform relative rotation with respect to the center plate 17, the coil spring is compressed to absorb the shock produced due to differential rotation of the side plates 15, 16 and the center plate 17. The coil spring 18 may be straight-shaped or bent from the straight shape in assembling. To achieve broad torsion, an arc spring, bent along the circumferential direction, may be used.

The seat member 19 is a component member of the damper unit 101 and is housed in the windows 15a, 16a formed in the side plates 15, 16 and in the window 17a formed in the center plate 17. The seat member is disposed between the circumferential end faces of the windows 15a, 16a, 17a and an end part of the coil spring 18, and may be formed of resin to reduce wear otherwise caused to the coil spring 18.

The thrust member 20 is a component member of the hysteresis unit 102, and is an annular friction member arranged between the side plate 15 and the center plate 17. The thrust member 20 is slidably mounted in pressure contact with the side plate 15 and with the center plate 17.

The thrust member 21 is a component member of the hysteresis unit 102, and is an annular friction member arranged between the side plate 16 and the center plate 17. The thrust member 21 is biased by the saucer spring 22 from the side plate 16 side and is mounted in slidable pressure contact with the center plate 17.

The saucer plate 22 is a component member of the hysteresis unit 102, and is a saucer-shaped spring disposed between the thrust member 21 and the side plate 16 to bias the thrust member 21 towards the center plate 17.

The lining plate 23 is an annular or disc-shaped plate, to which the friction members 24, 25 are secured, and is a component member of the limiter unit 103. The lining plate 23 is secured by welding or caulking to the center plate 17 at a site radially more inner than the hysteresis unit 102. The lining plate 23 includes a cylindrical portion 23a at a site more radially inner than the hysteresis unit 102. The cylindrical portion 23a is mounted via bearing 29 for rotation relative to a hub part 28a. The lining plate 23 is formed so as to by-pass the damper unit 101 and the hysteresis unit 102, and has a radially outer rim secured in position by the friction members 24, 25 with rivets, not shown.

The friction member 24 is arranged between the lining plate 23 and a cover part 28d of the hub member 28, and is fixedly mounted to the lining plate 23 by rivets, not shown. The friction member 24 is mounted for slidable pressure contact on the cover part 28d of the hub member 28.

The friction member 25 is arranged between the lining plate 23 and the pressure plate 26 and is fixedly mounted on the lining plate 23 by rivets, not shown. The friction member 25 is slidably pressure-contacted with the pressure plate 26.

The pressure plate 26 is an annular member arranged between the saucer spring 27 and the friction member 25. The pressure plate 26 is thrust by the saucer spring 27 against the friction member 25 so as to be slidably pressure-contacted with the friction member 25.

The saucer spring 27 is a saucer-shaped spring arranged between a support part 28c of the hub member 28 and the pressure plate 26. The saucer spring 27 biases the pressure plate 26 towards the friction member 25.

The hub member 28 outputs the motive power of rotation. The hub member 28 includes a flange part 28b extending from a preset radially outer peripheral site of the hub part 28a. The hub part 28a has a female spline portion on its radially inner peripheral surface that may be in splined engagement with a male spline portion on a shaft, whereby the hub part 28a may be axially slid relative to the shaft (male spline portion). The hub part 28a carries the lining plate 23 for relative rotation by bearing 29. The remote end part of the flange part 28b is a component member of the limiter unit 103 and includes the support part 28c and the cover part 28d. The support part 28c carries the saucer spring 27, while the cover part 28d is slidably pressure-contacted with the friction member 24.

The bearing 29 carries the lining plate 23 on an inner peripheral surface of the cylindrical portion 23a thereof to allow for relative rotation of the lining plate 23 relative to the hub member 28, and acts as a guide member to prevent center offset. The bearing 29 is arranged for extending not only radially but also axially of the lining plate 23 and the hub member 28.

In Example 1, the limiter unit 103 is arranged on a path of motive power transmission between the damper unit 101 and the planetary gear mechanism 4. By this configuration, the degree of freedom of the mounting position of the limiter unit 103 may be enhanced to render it possible to reduce the device size. On the other hand, the limiter unit 103 is not provided between the damper unit 101 and a fastened site of the cylindrical member 13 and the bolt 14, but is arranged at a preset distance from the fastened site along the axis of the output shaft 1a. By this configuration, the portion of the device extending radially from the axis of the output shaft 1a may be reduced in length to render it possible to reduce the size of the damper device 3. Moreover, the outer shape of the limiter unit 103 is larger in size than that of the damper unit 101. Thus, with the limiter unit 103, the inertial force for which has been assured, it is possible to effectively suppress the chattering otherwise produced in the planetary gear mechanism 4.

EXAMPLE 2

Figure 3:
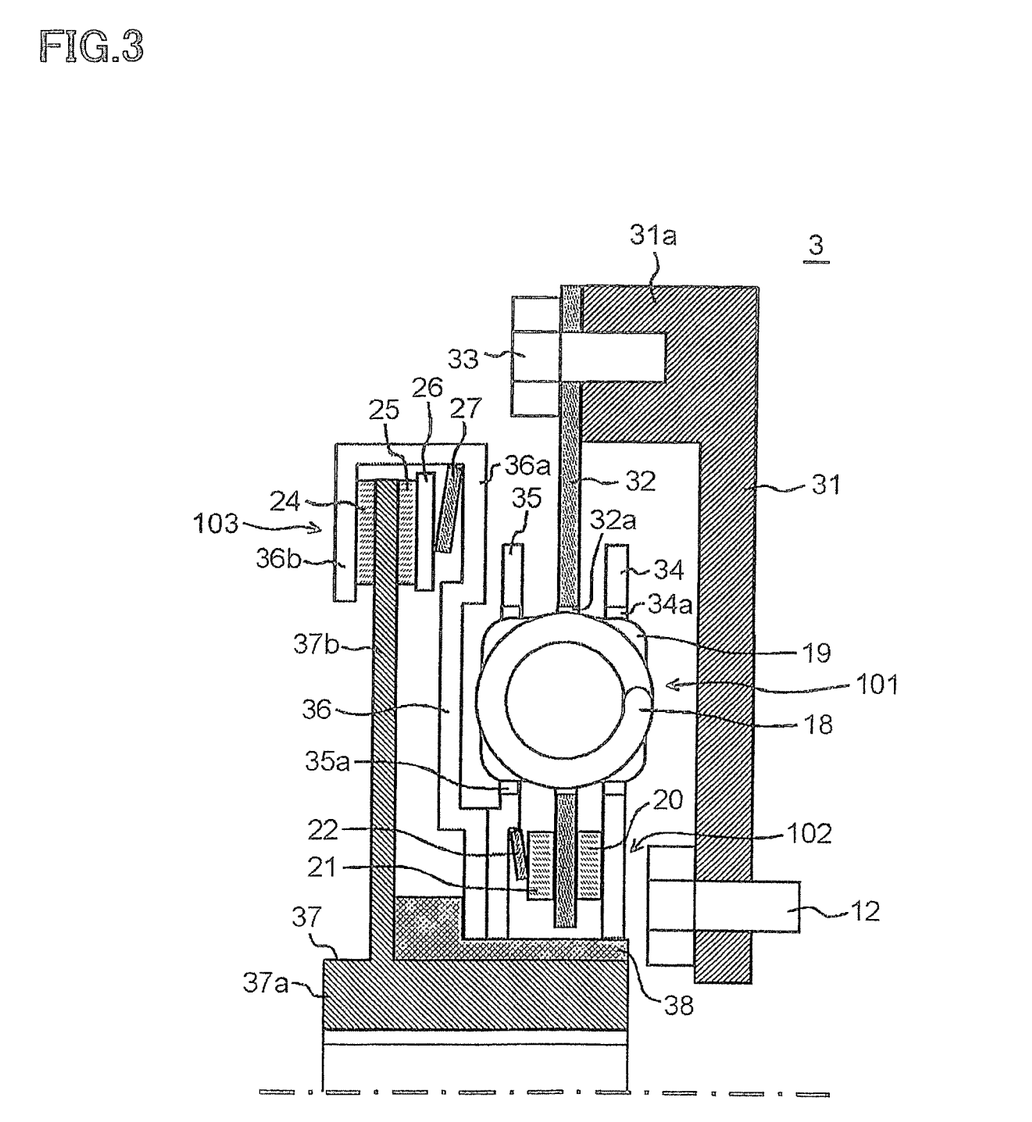
FIG. 3 is a schematic partial radial cross-sectional view showing the formulation of the damper device according to Example 2 of the present disclosure.

A damper device of Example 2 of the present disclosure will now be described with reference to the drawings. FIG. 3 depicts a schematic radial partial cross-sectional view showing the configuration of a damper device of Example 2 of the present disclosure.

The damper device 3 of Example 2 is a modification of Example 1. In this Example, the damper unit 101, hysteresis unit 102 and the limiter unit 103 are configured for being fastened to a flywheel 31 by a bolt 33 from a side of the flywheel 31 opposite to the flywheel side facing an engine (the right side of FIG. 3). For ease in assembling, the damper device 3 is formed as an assembly (integral unit) of the damper unit 101, hysteresis unit 102 and the limiter unit 103. The damper unit 101 is mounted in parallel with the hysteresis unit 102 and in series with the limiter unit 103. The limiter unit 103 is arranged on a path of motive power transmission between the damper unit 101 and the planetary gear mechanism 4 (4 of FIG. 1), and acts as an inertial member on an output side of the damper unit 101. The limiter unit 103 is arranged at a site axially offset from the damper unit 101. For ease in the operation of fastening the bolt 33, the outer shape of the limiter unit 103 is selected to be smaller in size than that of the damper unit 101. The damper device 3 includes a flywheel 31, a center plate 32, bolt(s) 33, side plates 34, 35, a coil spring 18, a seat member 19, thrust members 20, 21, a saucer spring 22, a plate 36, friction members 24, 25, a pressure plate 26, a hub member 37 and a bearing 38.

The coil spring 18, seat member 19, thrust members 20, 21, saucer spring 22, friction members 24, 25 and the pressure plate 26 are the same in configuration as those of Example 1 (see FIG. 2).

The flywheel 31 is an annular member fixedly mounted by the bolt(s) 12 to an output shaft (equivalent to 1a of FIG. 1) of the engine (equivalent to 1 of FIG. 1). The flywheel 31 includes a cylindrical portion 31a protruded from the surface facing the damper unit 101 in the vicinity of the radially outer periphery of the flywheel 31. The center plate 32 is fixedly mounted on the cylindrical portion 31a by bolt(s) 33.

The center plate 32 is an annular or disc-shaped plate arranged between the side plates 34, 35, and is a component member of the damper unit 101 while also being a component member of the hysteresis unit 102. The center plate 32 is fixedly mounted on the cylindrical portion 31a of the flywheel 31 by bolt(s) 33 at a radially more outer site than the damper unit 101. The center plate 32 includes a window 32a in which to hold the coil spring 18 and the seat member(s) 19. The seat member 19 is separably contacted with a peripheral end face of the window 32a. In the hysteresis unit 102, the center plate 32 is slidably pressure-contacted with the thrust members 20, 21 at its radially more inner site than the damper unit 101.

The bolt 33 is a member for fixedly mounting the center plate 32 to the cylindrical portion 31a of the flywheel 31. The bolt 33 is inserted from the side of the flywheel 11 opposite to the flywheel side facing the engine, that is, the right side of FIG. 3, and is fastened to the cylindrical member 31a.

The side plate 34 is an annular plate arranged on a side of the center plate 32 facing the flywheel 31, and is a component member of the damper unit 101, while also being a component member of the hysteresis unit 102. The side plate 34 is connected to the side plate 35 via rivets or the like at a radially more outer site than the damper unit 101. The side plate 34 includes, in the damper unit 101, a window 34a in which to hold the coil spring 18 and the seat member(s) 19, and the seat member 19 is separably contacted with a peripheral end face of the window 34a. The side plate 34 is slidably pressure-contacted with the thrust member 20 in the hysteresis unit 102 disposed radially more inwardly than the damper unit 101.

The side plate 35 is an annular plate arranged on a side of the center plate 32 opposite to the center plate side facing the flywheel 31, and is a component member of the damper unit 101, while being also a component member of the hysteresis unit 102. The side plate 35 is connected to the side plate 34 by rivets or the like at a more radially outer site than the damper unit 101. The side plate 35 includes, in the damper unit 101, a window 35a in which to hold the coil spring 18 and the seat member(s) 19, and the seat member 19 is separably contacted with a peripheral end face of the window 35a. The side plate 35 carries the saucer spring 22 in the hysteresis unit 102 disposed radially more inwardly than the damper unit 101. The side plate 35 has its radially inner portion connected to the plate 36 by welding or caulking.

The plate 36 is a plate rotated in unison with the side plate 35, and is a component member of the limiter unit 103. The outer peripheral portion of the plate 36 includes a support part 36a that carries the saucer spring 27 and a cover part 36b slidably pressure-contacted with the friction member 24. The plate has its inner peripheral portion connected by welding or caulking to the side plate 35.

The hub member 37 outputs the motive power of rotation. The hub member 37 includes a flange part 37b extending from a preset radially outer peripheral site of the hub part 37a. The hub part 37a has an internal (female) spline portion in its radially inner peripheral surface that may be in splined engagement with an external (male) spline portion on a shaft, not shown. The hub part 37a supports the side plates 34, 35 and the plate 36 for relative rotation by way of bearing 38. The foremost part of the flange part 37b is a component member of the limiter unit 103 and the friction members 24, 25 are secured by rivets, not shown, to the outer periphery of the flange part 37b.

The bearing 38 is a guide member that carries the side plates 34, 35 and the plate 36 for relative rotation on the hub member 37 to prevent center offset. The bearing 38 is arranged adapted to operate not only radially between the side plates 34, 35 and the plate 36 on one hand and the hub member 37 on the other hand, but also axially between the plate 36 and the hub member 37.

In Example 2, similar meritorious effects to those of Example 1 may be achieved. In addition, since the assembly of the damper unit 101, hysteresis unit 102 and the limiter unit 103 may be fastened by the bolt(s) 33 to the flywheel 31 from the side of the flywheel 31 opposite to the flywheel side facing the engine (right side of FIG. 3), the damper device may be mounted more readily on the engine.

EXAMPLE 3

Figure 4:
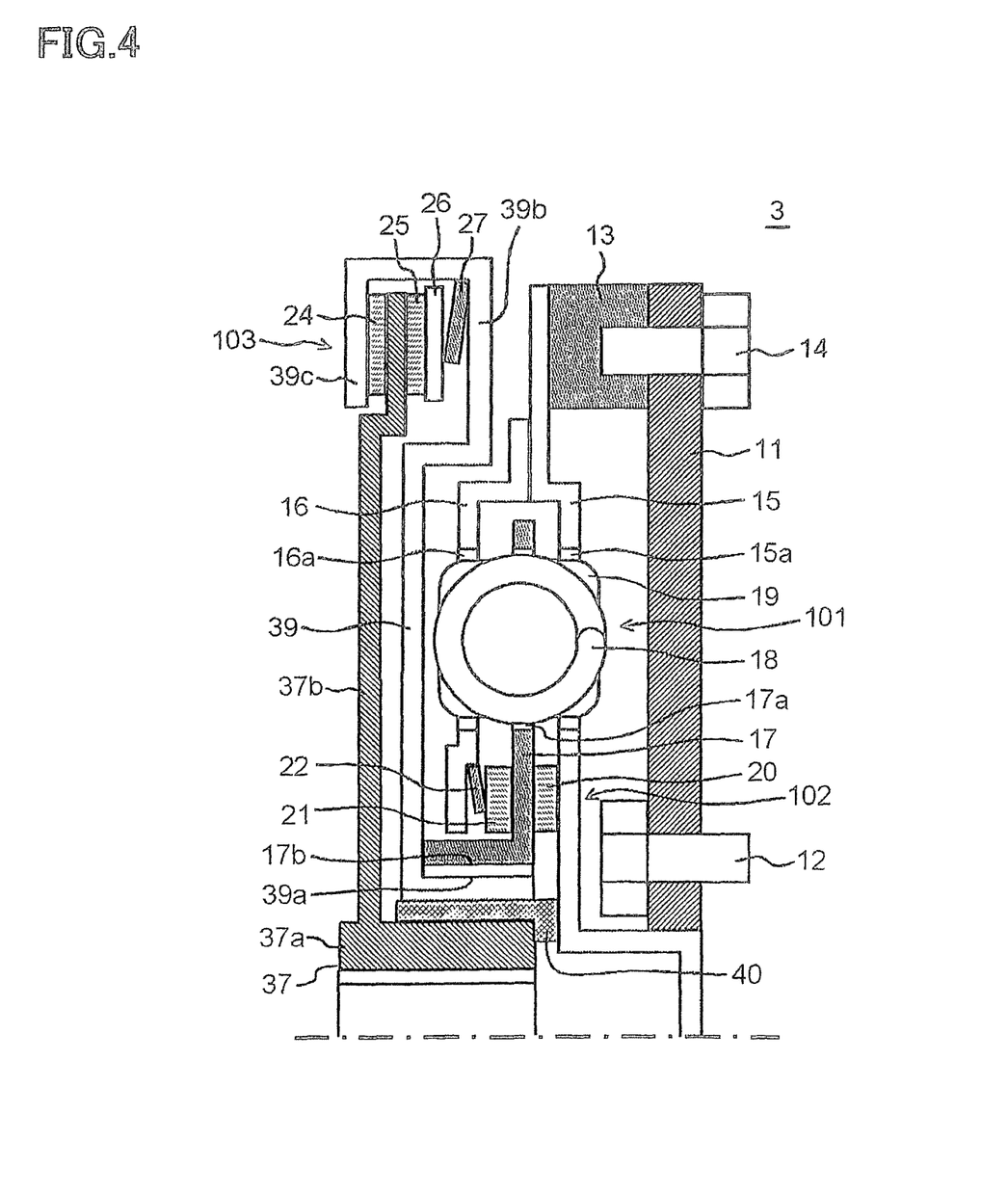
FIG. 4 is a schematic partial radial cross-sectional view showing the formulation of the damper device according to Example 3 of the present disclosure.

A damper device of Example 3 of the present disclosure will now be described with reference to the drawings. FIG. 4 depicts a schematic partial radial cross-sectional view showing the configuration of the damper device according to Example 3 of the present disclosure.

The damper device 3 of Example 3 is a modification of Example 1. That is, the assembly of the damper unit 101, hysteresis unit 102 and the limiter unit 103 is partitioned into an input side unit composed of the damper unit 101 and the hysteresis unit 102 and an output side unit composed only of the limiter unit 103. The output side unit may be assembled with the input side unit by splined engagement. The damper unit 101 is mounted in parallel with the hysteresis unit 102 and in series with the limiter unit 103. The limiter unit 103 is arranged on a path of motive power transmission between the damper unit 101 and the planetary gear mechanism (equivalent to 4 of FIG. 1), and acts as an inertial member on the output side of the damper unit 101. The limiter 103 has an outer shape larger in size than that of the damper unit 101 for securing an inertial effect and a chattering suppressing effect. The damper device 3 includes a flywheel 11, a cylindrical member 13, a bolt 14, side plates 15, 16, a center plate 17, a coil spring 18, a seat member(s) 19, thrust members 20, 21, a saucer spring 22, a plate 39, friction members 24, 25 and a pressure plate 26. The damper device 3 also includes a hub member 37 and a bearing 40.

The flywheel 11, cylindrical member 13, bolt(s) 14, side plates 15, 16, coil spring 18, seat member(s) 19, thrust members 20, 21 and the saucer spring 22 are similar to the corresponding components of the configuration of Example 1 (see FIG. 2). The hub member 37 is similar to the corresponding component of the configuration of Example 2 (see FIG. 3).

The center plate 17 is configured to be detachably engaged with the plate 39. The center plate 17 has a cylindrically-shaped radially inner portion, a radially inner peripheral surface of which has an internal (female) spline part 17b. The female spline part 17b is engaged with an external (male) spline part 39a of the plate 39 arranged on a radially inner side of the cylindrically-shaped radially inner portion and is configured to be axially slidable with respect to the male spline part 39a. Otherwise, the center plate 17 is similar in configuration to the center plate of Example 1 (17 of FIG. 2).

The plate 39 is configured to be rotated in unison with the center plate 17 and is a component member of the limiter unit 103. The radially outer peripheral portion of the plate 39 includes a support part 39b that supports the saucer spring 27 and a cover part 39c slidably pressure-contacted with the friction member 24. The plate 39 is configured to be detachably engaged with the center plate 17. The radially inner portion of the plate 39 includes a cylindrical portion arranged between the female spline part 17b of the center plate 17 and the bearing 40. The radially outer peripheral surface of the cylindrical portion includes the male spline part 39a. The male spline part 39a is in splined engagement with the female spline part 17b of the center plate 17, disposed on its radially outer side, so that the male spline part may be axially slid relative to the female spline part 17b. The cylindrical portion of the plate 39 has its radially inner surface carried for rotation relative to the hub part 37a of the hub member 37 via the bearing 40.

The bearing 40 is a guide member for supporting the plate 36 for rotation relative to the hub member 37 to prevent center offset. The bearing 40 is arranged adapted to act not only radially between the plate 39 and the hub member 37 but also axially between the side plate 15 and the hub member 37 (or may be axially between the plate 39 and the hub member 37, as desired).

In Example 3, the meritorious effect similar to that of Example 1 may be achieved. In addition, ease in mounting may be achieved by providing the input side unit composed of the damper unit 101 and the hysteresis unit 102 and the output side unit composed only of the limiter unit 103 and by assembling the output side unit by splined engagement with the input side unit.

EXAMPLE 4

Figure 5:
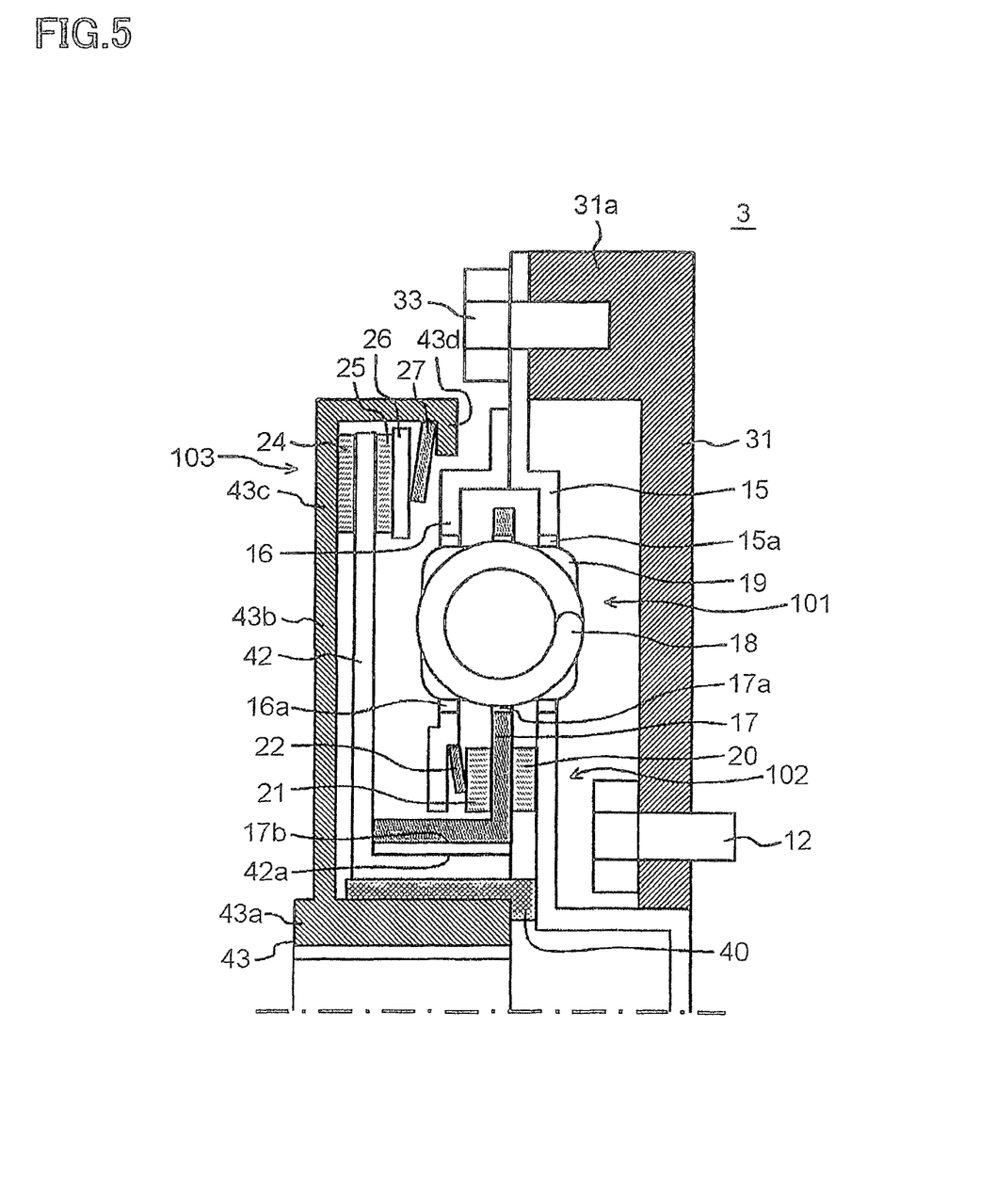
FIG. 5 is a schematic partial radial cross-sectional view showing the formulation of the damper device according to Example 4 of the present disclosure.

A damper device of Example 4 of the present disclosure will now be described with reference to the drawings. FIG. 5 depicts a schematic radial partial cross-sectional view showing the configuration of a damper device of Example 4 of the present disclosure.

The damper device 3 of Example 4 is a modification of Example 3. In this Example, the input side unit composed of the damper unit 101 and the hysteresis unit 102 may be fastened by bolt(s) 33 to the flywheel 31, while the output side unit composed solely of the limiter unit 103 may be assembled by splined engagement with the input side unit. The damper unit 101 is mounted in parallel with the hysteresis unit 102 and in series with the limiter unit 103. The limiter unit 103 is arranged on a path of motive power transmission between the damper unit 101 and the planetary gear mechanism 4 (4 of FIG. 1), and acts as an inertial member on the output side of the damper unit 101. The limiter unit 103 is arranged on a site axially offset from the damper unit 101. For ease in the operation of fastening the bolt(s) 33, the outer shape of the limiter unit 103 is selected to be smaller in size than that of the damper unit 101. The damper device 3 includes a flywheel 31, a bolt(s) 33, side plates 15, 16, a center plate 17, a coil spring 18, a seat member(s) 19, thrust members 20, 21, a saucer spring 22, a lining plate 42, friction members 24, 25, a pressure plate 26, a hub member 43 and a bearing 40.

The configuration of the side plates 15, 16, coil spring 18, seat member 19, thrust members 20, 21, saucer spring 22, friction members 24, 25 and the pressure plate 26 is similar to that of Example 1 (see FIG. 2). The configuration of the flywheel 31 and the bolt 33 is similar to that of Example 2 (see FIG. 3). The configuration of the center plate 17 and the bearing 40 is similar to that of Example 3 (see FIG. 4).

The lining plate 42 is an annular or disc-shaped plate, to which the friction members 24, 25 are secured. The lining plate 42 is a component member of the limiter unit 103, and is configured to be detachably engaged with the center plate 17. The radially inner portion of the lining plate 42 includes a cylindrical portion disposed between the internal (female) spline part 17b of the center plate 17 and the bearing 40. An external (male) spline part 42a is formed on the radially outer peripheral surface of the cylindrical portion. The male spline part 42a is engaged with the female spline part 17b of the center plate 17, arranged on the radially outer side of the male spline part 42a, so that the male spline part may be axially slid relative to the female spline part 17b. The friction members 24, 25 are secured by rivets, not shown, to the radially outer peripheral portion of the lining plate 42.

The hub member 43 outputs the motive power of rotation. The hub member 43 includes a flange part 43b extending from a preset radially outer peripheral site of the hub part 43a. The hub part 43a has a female spline portion on its radially inner peripheral surface that may be in spline engagement with a male spline portion on a shaft, not shown. The female spline portion may be axially slid relative to the male spline portion on the shaft, not shown. The hub part 43a carries the lining plate 42 for relative rotation by bearing 40. The foremost part of the flange part 43b is a component member of the limiter unit 103 and includes a cover part 43c slidably pressure-contacted with the friction member 24 and a support part 43d that supports the saucer spring 27.

In Example 4, the meritorious effects similar to those of Example 1 may be achieved. In addition, the input side unit composed of the damper unit 101 and the hysteresis unit 102 may be fastened by the bolt(s) 33 to the flywheel 31 from the side of the flywheel 31 opposite to the flywheel side facing the engine (right side of FIG. 3), so that the damper device may be mounted more readily on the engine. In addition, ease in assembling may be achieved by providing the input side unit composed of the damper unit 101 and the hysteresis unit 102 and the output side unit composed only of the limiter unit 103 and by assembling the output side unit by way of splined engagement with the input side unit.

EXAMPLE 5

Figure 6:
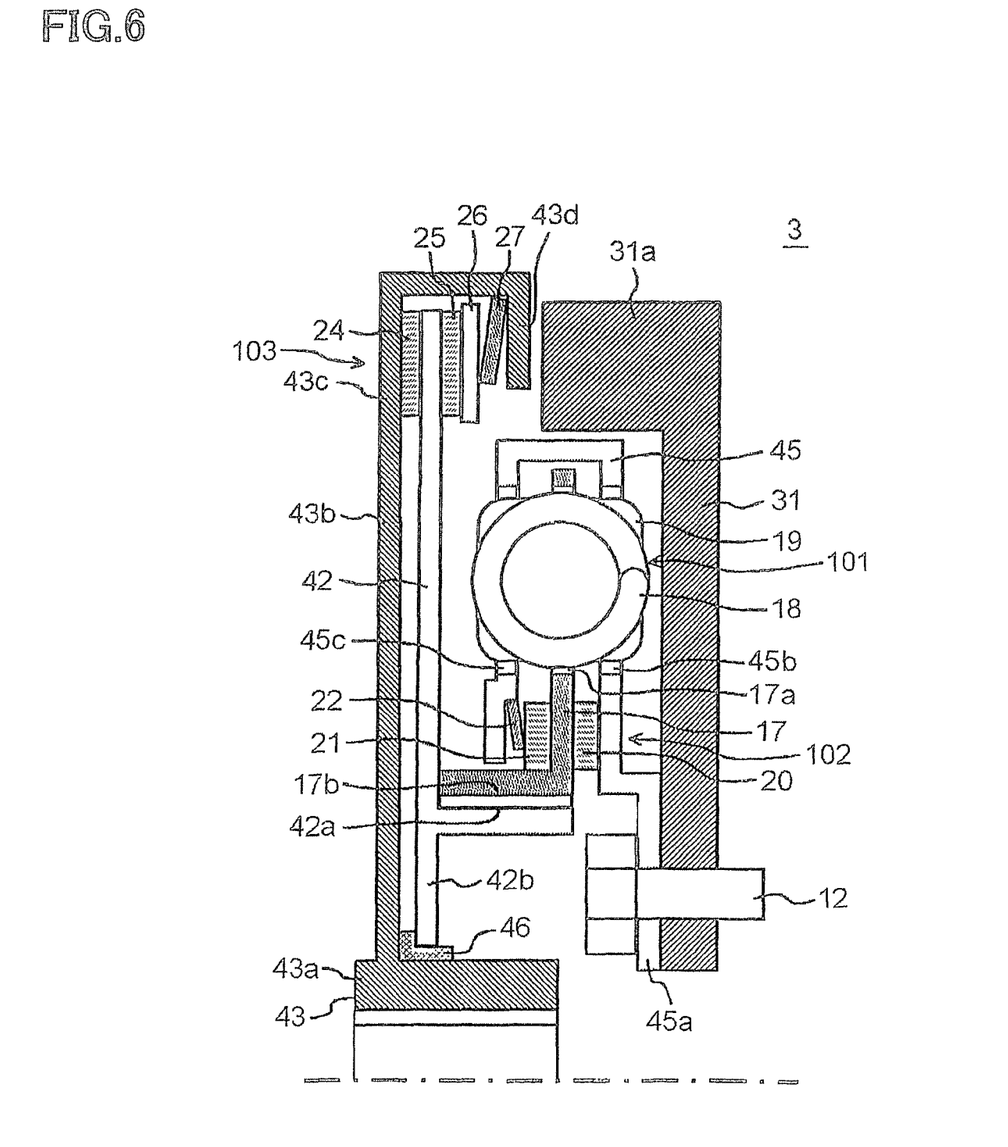
FIG. 6 is a schematic partial radial cross-sectional view showing the formulation of the damper device according to Example 5 of the present disclosure.

A damper device of Example 5 of the present disclosure will now be described with reference to the drawings. FIG. 6 depicts a schematic radial partial cross-sectional view showing the configuration of a damper device of Example 5 of the present disclosure.

The damper device 3 of Example 5 is a modification of Example 4. The input side unit composed of the damper unit 101 and the hysteresis unit 102 may be fastened by bolt 12 to an output shaft of the engine (equivalent to 1a of FIG. 1), while the output side unit composed only of the limiter unit 103 is assembled in splined engagement with the input side unit. The damper unit 101 is mounted in parallel with the hysteresis unit 102 and in series with the limiter unit 103. The limiter unit 103 is arranged on a path of motive power transmission between the damper unit 101 and the planetary gear mechanism (equivalent to 4 of FIG. 1), and acts as an inertial member on the output side of the damper unit 101. The limiter unit 103 has an outer shape larger in size than that of the damper unit 101 for securing an inertial effect and a chattering suppressing effect. The damper device 3 includes a flywheel 31, a side plate 45, a center plate 17, a coil spring 18, a seat member(s) 19, thrust members 20, 21, a saucer spring 22, a lining plate 42, friction members 24, 25, a pressure plate 26, a hub member 43 and a bearing 46.

The configuration of the coil spring 18, seat member 19, thrust members 20, 21, saucer spring 22, friction members 24, 25 and the pressure plate 26 is similar to that of Example 1 (see FIG. 2). The configuration of the center plate 17 is similar to that of Example 3 (see FIG. 4). The configuration of the hub member 43 is similar to that of Example 4 (see FIG. 5).

The flywheel 31 is an annular member fixedly mounted to the output shaft (equivalent to 1a of FIG. 1) of the engine (equivalent to 1 of FIG. 1) along with the side plate 45 by bolt(s) 12. A cylindrical portion 31a protuberantly formed on a surface of the flywheel 31 facing the damper unit 101 in the vicinity of the radially outer peripheral surface of the flywheel 3.

The side plate 45 is an annular plate disposed on either sides of the center plate 17 along the axial direction, and is a component member of the damper unit 101, while also being a component member of the hysteresis unit 102. The side plate 45 is in the shape of a letter U at a radially more outer site than the damper unit 101 and is there disposed astride the center plate 17. In the damper unit 101, the side plate 45 includes windows 45b, 45c in which to hold the coil spring 18 and the seat member(s) 19, and the seat member 19 is separably contacted with peripheral end faces of the windows 45b, 45c. In the hysteresis unit 102, disposed radially more inwardly than the damper unit 101, the plate portion of the side plate 45 facing the flywheel 31 is slidably pressure-contacted with the thrust member 20. The opposite plate portion of the side plate 45 carries the saucer spring 22. The side plate 45 includes a radially inwardly extending plate portion 45a. The radially inwardly extending plate portion 45a is abutted against the flywheel 31 and is fixedly mounted to the output shaft (equivalent to 1a of FIG. 1) of the engine (equivalent to 1 of FIG. 1) along with the flywheel 31 by bolt(s) 12.

The lining plate 42 is an annular or disc-shaped plate, to which the friction members 24, 25 are secured. The lining plate 42 is a component member of the limiter unit 103. The radially inner portion of the lining plate 42 includes a cylindrical portion disposed at the radially more inner site than the internal (female) spline part 17b of the center plate 17. An external (male) spline part 42a is formed on a radially outer peripheral surface of the cylindrical portion. The male spline part 42a is engaged with the mating female spline part 17b of the center plate 17. The friction members 24, 25 are fixedly mounted by rivets, not shown, to the radially outer peripheral portion of the lining plate 42. This lining plate 42 includes a radially inwardly extending portion 42b. The radially inner peripheral end of the radially inwardly extending portion 42b is supported for rotation via bearing 46 by the hub part 43a of the hub member 43.

The bearing 46 is a guide member that supports the lining plate 42 by the hub member 43 for relative rotation to prevent center offset. The bearing 46 is provided for acting not only radially between the radially inwardly extending portion 42b of the lining plate 42 and the hub member 43 but also axially between the radially inwardly extending portion 42b and the hub member 43.

In Example 5, the meritorious effect similar to that in Example 1 may be achieved. In addition, since the input side unit composed of the damper unit 101 and the hysteresis unit 102 may be fastened by bolt(s) 12 to the engine output shaft (equivalent to 1a of FIG. 1) along with the flywheel 31, the number of the component members as well as that of assembling process steps may be reduced. Furthermore, since the output side unit composed solely of the limiter unit 103 may be assembled by splined engagement to the input side unit, ease in assembling may be enhanced.

EXAMPLE 6

Figure 7:
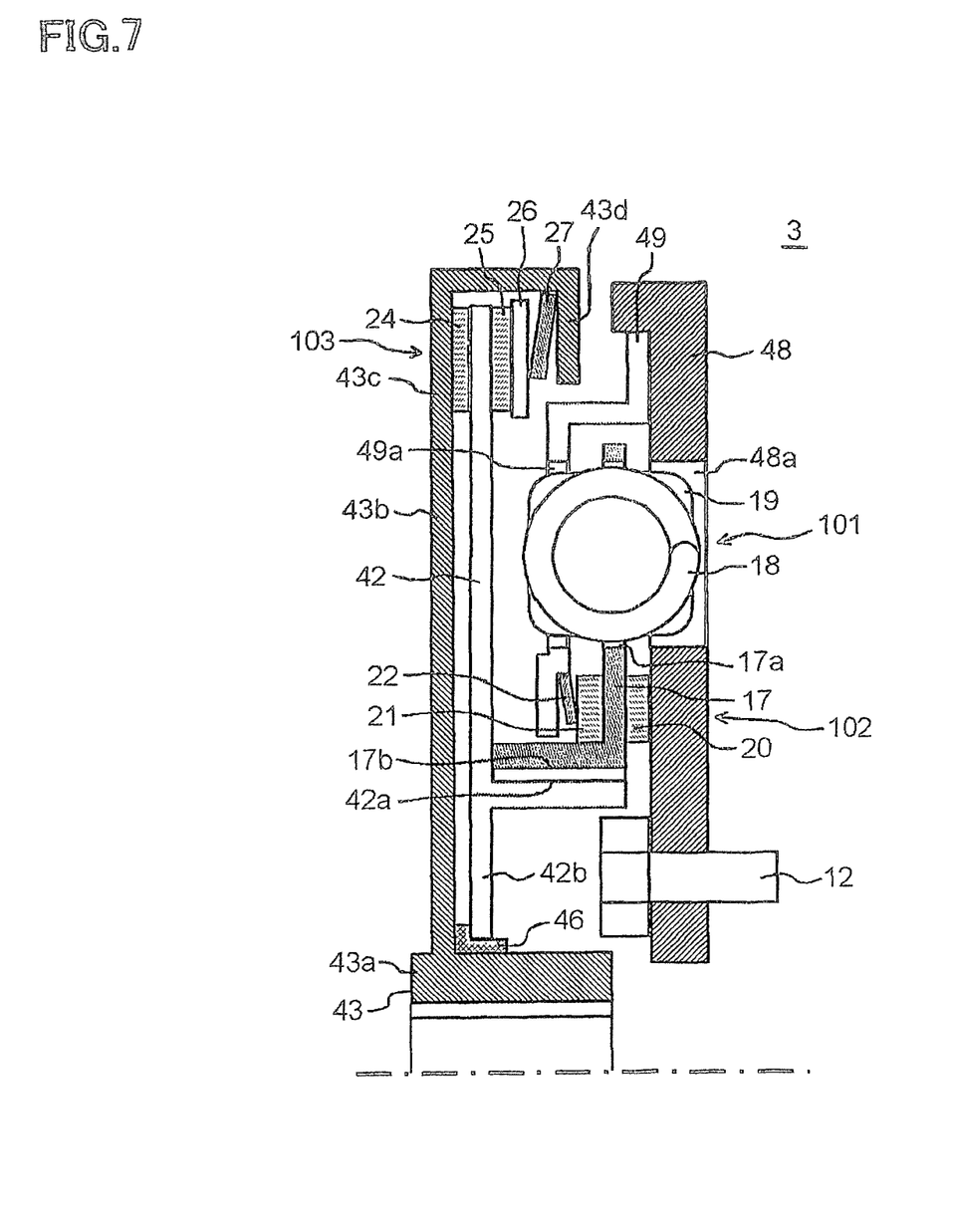
FIG. 7 is a schematic partial radial cross-sectional view showing the formulation of the damper device according to Example 6 of the present disclosure.

A damper device of Example 6 of the present disclosure will now be described with reference to the drawings. FIG. 7 depicts a schematic radial partial cross-sectional view showing the configuration of a damper device of Example 6 of the present disclosure.

The damper device 3 of Example 6 is a modification of Example 5. In the input side unit composed of the damper unit 101 and the hysteresis unit 102, the flywheel 48 is a component member of both the damper unit 101 and the hysteresis unit 102. The output side unit composed only of the limiter unit 103 is configured to be assembled in splined engagement with the input side unit. The damper unit 101 is mounted in parallel with the hysteresis unit 102 and in series with the limiter unit 103. The limiter unit 103 is arranged on a path of motive power transmission between the damper unit 101 and the planetary gear mechanism (equivalent to 4 of FIG. 1), and acts as an inertial member on the output side of the damper unit 101. The limiter 103 has an outer shape larger in size than that of the damper unit 101 for securing an inertial effect and a chattering suppressing effect. The damper device 3 includes a flywheel 48, a side plate 49, a center plate 17, a coil spring 18, a seat member(s) 19, thrust member(s) 20, 21, a saucer spring 22, a lining plate 42, friction members 24, 25, a pressure plate 26, a hub member 43 and a bearing 46.

The configuration of the center plate 17, coil spring 18, seat member(s) 19, thrust members 20, 21, saucer spring 22, lining plate 42, friction members 24, 25, pressure plate 26, hub member 43 and the bearing 46 is similar to that of Example 5 (see FIG. 6).

The flywheel 48 is an annular member fixedly mounted to the output shaft (equivalent to 1a of FIG. 1) of the engine (equivalent to 1 of FIG. 1) by bolt(s) 12, and is a component member of the damper unit 101, while also being a component member of the hysteresis unit 102. The flywheel 48 is welded or caulked to the side plate 49 in a radially more outer portion than the damper unit 101. In the damper unit 101, the flywheel 48 includes a window 48a in which to hold the coil spring 18 and the seat member(s) 19, and the seat member 19 is separably contacted with a peripheral end face of the window 48a. In the hysteresis unit 102, disposed radially more inwardly than the damper unit 101, the flywheel 48 is slidably pressure-contacted with the thrust member 20. In a radially more inner portion than the internal (female) spline part 17b of the center plate 17, the flywheel 48 is fixedly mounted by bolt(s) 12 to the output shaft (1a of FIG. 1) of the engine (1 of FIG. 1).

The side plate 49 is an annular plate arranged on a side of the center plate 17 opposite to the center plate side facing the flywheel 48, and is a component member of the damper unit 101, while also being a component member of the hysteresis unit 102. The side plate 49 is welded or caulked to the flywheel 48 at a radially more outer site than the damper unit 101. In the damper unit 101, the side plate 49 includes a window 49a in which to hold the coil spring 18 and the seat member(s) 19, and the seat member 19 is separably contacted with a peripheral end face of the window 49a. In the hysteresis unit 102, disposed radially more inwardly than the damper unit 101, the side plate 49 supports the saucer spring 22.

In Example 6, the meritorious effect similar to that in Example 1 may be achieved. In addition, in the input side unit composed of the damper unit 101 and the hysteresis unit 102, the flywheel 48 is also a component member of the damper unit 101, while also being a component member of the hysteresis unit 102. Hence, the number of the component members as well as that of assembling process steps may be reduced. Moreover, since the output side unit composed solely of the limiter unit 103 may be assembled to the input side unit by splined engagement, ease in assembling may be enhanced.

EXAMPLE 7

Figure 8:
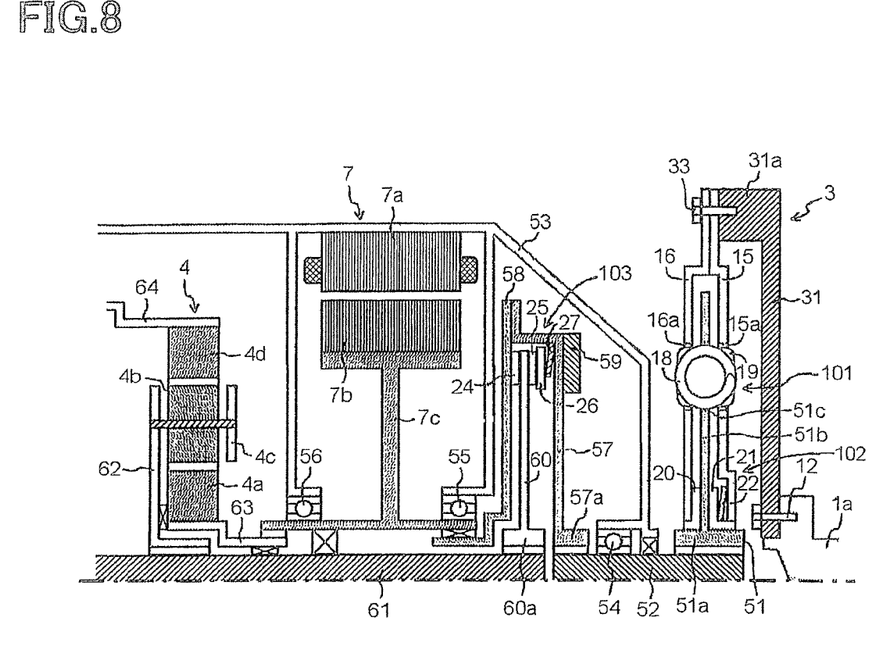
FIG. 8 is a schematic partial radial cross-sectional view showing the formulation of a motive power transmission apparatus including the damper device of Example 7 of the present disclosure and a motor.

A damper device of Example 7 of the present disclosure will now be described with reference to the drawings. FIG. 8 depicts a schematic radial partial cross-sectional view showing the configuration of a motive power transmission device including the damper device of Example 7 of the present disclosure and a motor.

In the damper device 3 of Example 7, the input side unit composed of the damper unit 101 and the hysteresis unit 102 is fully separated from the output side unit composed solely of the limiter unit 103. The limiter unit 103 is arranged in a housing 53 which houses the generator/motor 7 and the planetary gear mechanism 4 and, specifically, the limiter unit is arranged at a site closer to the engine output shaft 1a than the generator/motor 7. The damper unit 101 is mounted in parallel with the hysteresis unit 102 and in series with the limiter unit 103. The limiter unit 103 is arranged on a path of motive power transmission between the damper unit 101 and the planetary gear mechanism 4, and acts as an inertial member on the output side of the damper unit 101.

In the motive power transmission path from the output shaft 1a of the engine (equivalent to 1 of FIG. 1) to the damper unit 101, in the motive power transmission apparatus, inclusive of the damper device 3, the motive power of rotation of the output shaft 1a is transmitted to the flywheel 31. The flywheel 31 is fixedly mounted by bolt(s) 12 to the output shaft 1a. The motive power is then transmitted to the side plates 15, 16 fixedly mounted by bolt(s) 33 on a cylindrical portion 31a of the flywheel. The motive power is then transmitted to the damper unit 101 and the hysteresis unit 102 arranged in parallel to each other. The damper unit 101 includes the coil spring 18 and the seat member 19, and the hysteresis unit 102 includes the thrust members 20, 21 and the saucer spring 22.

In the motive power transmission path from the damper unit 101 to the planetary gear mechanism 4, the motive power of rotation from the damper unit 101 and the hysteresis unit 102 is transmitted to a hub member 51 (a flange part 51b, a window 51c) and thence transmitted to a shaft 52 kept in splined engagement with the hub member 51 (hub part 51a). It is noted that the shaft 52 is supported by the housing 53 for relative rotation via bearing 54. The motive power of rotation of the shaft 52 is entered into the housing 53 and transmitted to a support plate 57 (hub part 57a) kept in splined engagement with the shaft 52. The motive power is then transmitted to a cover plate 58, welded or riveted to the support plate 57, before being transmitted to the limiter unit 103. The limiter unit includes the friction members 24, 25, pressure plate 26 and the saucer spring 27. It is noted that an inertial member 59 is riveted or welded to the support plate 57 to impart stronger inertia to the motive power transmission path between the damper unit 101 and the planetary gear mechanism 4. The motive power of rotation from the limiter unit 103 is transmitted to the lining plate 60, thence transmitted to a shaft 61, kept in splined engagement with the lining plate 60 (hub part 60a) and thence transmitted to a carrier 62 of the planetary gear mechanism 4 kept in splined engagement with the shaft 61. This causes the rotation of a pinion 4b, mounted for rotation on the carrier 62, on its own axis, and hence the rotation of the ring gear 4d. It is noted that the shaft 61 is carried for rotation in the housing 53, via a bearing, not shown, at a position(s) not shown.

In the housing 53, the generator/motor 7 is arranged in a spacing delimited between the limiter 103 and the planetary gear mechanism 4. The generator/motor 7 includes a stator 7a, secured to the housing 53, a rotor 7b, run in rotation at an inner rim of the stator 7a, and a shaft 7c secured to the rotor 7b. The shaft 7c is carried by the housing 53 for rotation via bearings 55, 56. The shaft 7c is kept in splined engagement with a shaft 63 running in rotation in unison with the sun gear 4a of the planetary gear mechanism 4. The sun gear 4a meshes with the pinion 4b. The pinion 4b meshes with the ring gear 4d secured to a shaft 64. The motive power of rotation of the shaft 64 is transmitted via belt (equivalent to 6 of FIG. 1) to a reduction gear mechanism (equivalent to 5 of FIG. 1).

In Example 7, the meritorious effect similar to that in Example 1 may be achieved. In addition, since the limiter unit 103 is arranged in the housing 53 which houses the generator/motor 7 and the planetary gear mechanism 4, the characteristic of the limiter unit 103 may be stabilized by an oily environment within the housing 53.

EXAMPLE 8

Figure 9:
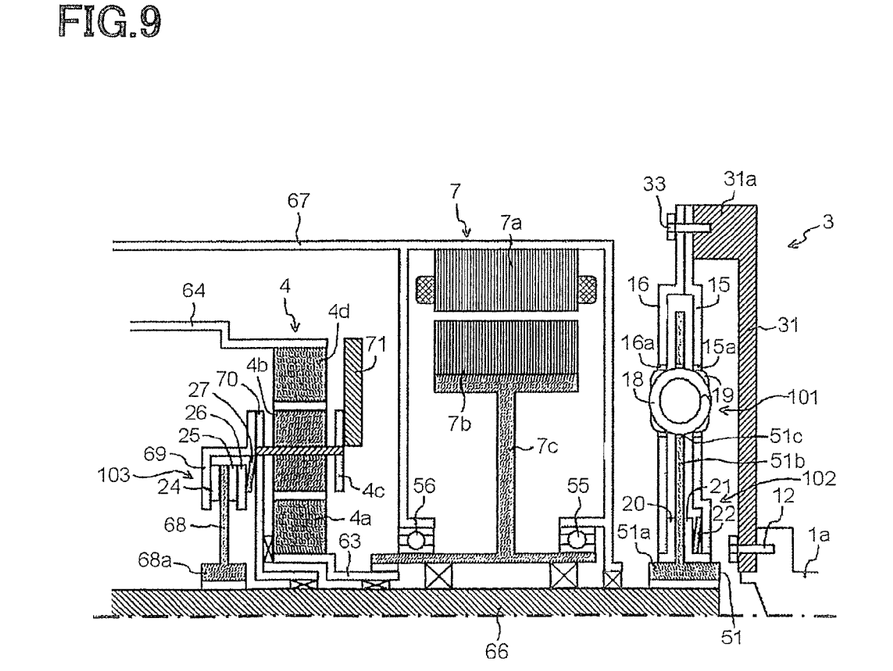
FIG. 9 is a schematic partial radial cross-sectional view showing the formulation of a motive power transmission apparatus including the damper device and a motor according to Example 8 of the present disclosure.

A damper device of Example 8 of the present disclosure will now be described with reference to the drawings. FIG. 9 depicts a schematic radial partial cross-sectional view showing the configuration of a motive power transmission device including the damper device of Example 8 of the present disclosure and a motor.

The damper device 3 of the present Example 8 is a modification of Example 7. The input side unit composed of the damper unit 101 and the hysteresis unit 102 is fully separated from the output side unit composed solely of the limiter unit 103. The output side unit, composed solely of the limiter unit 103, is arranged in a housing 67 which houses the generator/motor 7 and the planetary gear mechanism 4. Specifically, the output side unit is arranged on a side of the planetary gear mechanism 4 opposite to its side facing the generator/motor 7. The damper unit 101 is mounted in parallel with the hysteresis unit 102 and in series with the limiter unit 103. The limiter unit 103 is arranged on a path of motive power transmission between the damper unit 101 and the planetary gear mechanism 4, and acts as an inertial member on an output side of the damper unit 101.

In the motive power transmission path from the output shaft 1a of the engine (equivalent to 1 of FIG. 1) to the damper unit 101, in the motive power transmission device, inclusive of the damper device 3, the motive power of rotation of the output shaft 1a is transmitted to the flywheel 31 fixedly mounted on the output shaft 1a by bolt(s) 12. The motive power of rotation is then transmitted to the side plates 15, 16, fixedly mounted by bolt(s) 33 on the cylindrical portion 31a of the flywheel 31, and then transmitted to the damper unit 101 and the hysteresis unit 102 mounted in parallel to each other. The damper unit 101 includes the coil spring 18 and the seat member(s) 19, and the hysteresis unit 102 includes the thrust members 20, 21 and the saucer spring 22.

In the motive power transmission system from the damper unit 101 to the planetary gear mechanism 4, the motive power of rotation from the damper unit 101 and the hysteresis unit 102 is transmitted to the hub member 51 and thence transmitted to the shaft 66 kept in splined engagement with the hub member 51. It is noted that the shaft 66 is supported for rotation in the housing 67, at a position not shown, via a bearing, also not shown. The motive power of rotation of the shaft 66 is entered into the housing 67 and transmitted to a lining plate 68 (hub part 68a) kept in splined engagement with the shaft 66 and to the limiter unit 103 in this order. The limiter unit includes the friction members 24, 25, pressure plate 26 and the saucer spring 27. The motive power of rotation from the limiter unit 103 is transmitted to a cover plate 69 and thence transmitted to a carrier 70 of the planetary gear mechanism 4 connected to the cover plate 69 by rivets, welding or the like. The pinion 4b, carried for rotation by the carrier 70, is thus caused to rotate about its own axis to cause rotation of the ring gear 4d. In FIG. 9, the damper unit 101 is arranged outside the housing 67, however, it may also be disposed inside the housing. The carrier 70 also acts as a support plate that supports the saucer spring 27 in the limiting unit 103. The carrier 70 may also act as a cover plate slidably pressure-contacted with the friction member in the limiter unit 103. The carrier 4c that supports the pinion 4b for rotation is arranged on a side of the pinion 4b opposite to its side facing the carrier 70. The carrier 4c is rotated in unison with the carrier 70. It is noted that an inertial member 71 is riveted or welded to the carrier 4c to impart stronger inertia to the motive power transmission path between the damper unit 101 and the planetary gear mechanism 4. Meanwhile, the carrier 4c itself may be extended radially outwardly without being connected to the inertial member 71. Since the carrier may then perform the function as the inertial member, it is possible to reduce the number of component members.

The generator/motor 7 is arranged in a spacing in the planetary gear mechanism 4 disposed towards the output shaft 1a, and includes a stator 7a secured to the housing 67. The generator/motor 7 also includes a rotor 7b, rotating along the inner peripheral surface of the stator 7a and a shaft 7c secured to the rotor 7b. The shaft 7c is supported by bearings 55, 56 within the housing 67, and is kept in splined engagement with the shaft 63 that is rotated in unison with the sun gear 4a of the planetary gear mechanism 4. The sun gear 4a meshes with the pinion 4b. The pinion 4b meshes with the ring gear 4d, which is secured to the shaft 64. The motive power of rotation of the shaft 64 is transmitted via belt (equivalent to 6 of FIG. 1) to the reduction gear mechanism (5 of FIG. 1).

In Example 8, the meritorious effect similar to that in Example 1 may be achieved. In addition, since the limiter unit 103 is arranged in the housing 67 which houses the generator/motor 7 and the planetary gear mechanism 4, the characteristic of the limiter unit 103 may be stabilized by an oily environment within the housing 53. Moreover, since the inertial member 71 is secured to the carrier 4c which is physically separated from but rotated as one with the limiter unit 103, it is possible to improve the spatial housing characteristic as well as to simplify the connection structure. Additionally, since the carrier 70 operates as a support plate for supporting the saucer spring 27 in the limiter unit 103, it is possible to reduce the number of component members.

The particular exemplary embodiments or examples may be modified or adjusted within the gamut of the entire disclosure of the present disclosure, inclusive of claims, based on the fundamental technical concept of the disclosure. Further, variegated combinations or selection of elements disclosed herein may be made within the scope of the claims. The present disclosure may encompass various modifications or variations that may occur to those skilled in the art in accordance with and within the gamut of the entire disclosure of the present disclosure, inclusive of claims and the technical concept of the present disclosure.

EXPLANATION OF REFERENCE SIGNS 1 engine (motive power source)
1a output shaft
2 electric motor
3 damper device
4 planetary gear mechanism (gear train)
4a sun gear
4b pinion
4c carrier
4d ring gear
5 reduction gear mechanism
6 belt
7 generator/motor
7a stator
7b rotor
7c shaft
8 inverter
9 battery
11 flywheel (plate member)
12 bolt(s)
13 cylindrical member
14 bolt(s)
15 side plate
15a window
16 side plate
16a window
17 center plate
17a window
17b internal (female) spline part
18 coil spring
19 seat member
20, 21 thrust members
22 saucer spring
23 lining plate
23a cylindrical portion
24, 25 friction members
26 pressure plate
27 saucer spring
28 hub member
28a hub part
28b flange part
28c support part
28d cover part
29 bearing
31 flywheel
31a cylindrical portion
32 center plate
32a window
33 bolt(s)
34 side plate
34a window
35 side plate
35a window
36 plate
36a support part
36b cover part
37 hub member
37a hub part
37b flange part
38 bearing
39 plate
39a external (male) spline part
39b support part
39c cover part
40 bearing
42 lining plate
42a external (male) spline part
42b radially inwardly extending portion
43 hub member
43a hub part
43b flange part
43c cover part
43d support part
45 side plate
45a radially inwardly extending portion
45b, 45c windows
46 bearing
48 flywheel
48a window
49 side plate
49a window
51 hub member
51a hub part
51b flange part
51c window
52 shaft
53 housing
54, 55, 56 bearings
57 support plate
57a hub part
58 cover plate
59 inertial member
60 lining plate
60a hub part
61 shaft
62 carrier
63 shaft
64 shaft
66 shaft
67 housing
68 lining plate
68a hub part
69 cover plate
70 carrier
71 inertial member
101 damper unit
102 hysteresis unit
103 limiter unit

The invention claimed is:
1. A damper device comprising:
a damper unit arranged on a motive power transmission path between a motive power source and a gear mechanism and configured for absorbing torque fluctuations produced between said motive power source and said gear mechanism by way of an elastic force;
a limiter unit that produces slip when said torque fluctuations have exceeded a preset value; and
a bearing which is supported by an output side component of the limiter unit and supports an input side component of the limiter unit and acts to restrict movement of the limiter unit both radially and axially between the input and output side components;
said limiter unit being disposed on a motive power transmission path between said damper unit and said gear mechanism;
the output side component of said limiter unit being directly attached to a shaft connected to said gear mechanism.

2. The damper device according to claim 1, wherein
said damper device includes a first assembly and a second assembly assembled on said first assembly;
said first assembly including said damper unit and said limiter unit and being formed as an integral unit;
said second assembly including a plate member mounted on an output shaft of the motive power source.

3. The damper device according to claim 2, wherein
an outer shape of said limiter unit is larger in size than that of said damper unit.

4. The damper device according to claim 3, wherein
an input side component of said damper unit is directly mounted on an output shaft of said motive power source.

5. The damper device according to claim 4, further comprising:
a plate member mounted on said output shaft of said motive power source;
said plate member acting as said input side component of said damper unit.

6. The damper device according to claim 2, wherein
an input side component of said damper unit is directly mounted on an output shaft of said motive power source.

7. The damper device according to claim 6, further comprising:
a plate member mounted on said output shaft of said motive power source;
said plate member acting as said input side component of said damper unit.

8. The damper device according to claim 1, wherein
said damper unit and said limiter unit are separate units;
said input side component of said limiter unit being detachably engaged with an output side component of said damper unit;
said output side component of said limiter unit being detachably engaged with said shaft connected to said gear mechanism.

9. The damper device according to claim 8, wherein
said input side component of said limiter unit is in splined engagement with said output side component of said damper unit;
said output side component of said limiter unit being in splined engagement with said shaft.

10. The damper device according to claim 9, wherein
an input side component of said damper unit is directly mounted on an output shaft of said motive power source.

11. The damper device according to claim 10, further comprising:
a plate member mounted on said output shaft of said motive power source;
said plate member acting as said input side component of said damper unit.

12. The damper device according to claim 8, wherein
an input side component of said damper unit is directly mounted on an output shaft of said motive power source.

13. The damper device according to claim 12, further comprising:
a plate member mounted on said output shaft of said motive power source;
said plate member acting as said input side component of said damper unit.

14. The damper device according to claim 1, wherein
an input side component of said damper unit is directly mounted on an output shaft of said motive power source.

15. The damper device according to claim 14, further comprising:
a plate member mounted on said output shaft of said motive power source;
said plate member also acting as said input side component of said damper unit.

16. The damper device according to claim 1, wherein
said limiter unit is arranged within a housing accommodating said gear mechanism.

17. The damper device according to claim 16, wherein
said gear mechanism includes a sun gear, a ring gear arranged on an outer periphery of said sun gear;
a pinion meshing with said sun gear and said ring gear, and
a carrier supporting said pinion for rotation;
said carrier also acting as said output side component of said limiter unit.

18. The damper device according to claim 17, wherein
said carrier includes a first carrier arranged on one side in the axial direction of said pinion;
said gear mechanism also including:
a second carrier arranged on the other side in the axial direction of said pinion;
said second carrier having mounted thereon an inertial member.

19. The damper device according to claim 1,
wherein said limiter unit having has a larger outermost radial dimension than that of said damper unit.

* * * * *